United States Patent [19]
Guillemette

[11] Patent Number: 5,980,226
[45] Date of Patent: Nov. 9, 1999

[54] MODULAR DIE ASSEMBLY

[76] Inventor: A. Roger Guillemette, 10 Pike St., W. Warwick, R.I. 02893

[21] Appl. No.: 08/808,512

[22] Filed: Feb. 27, 1997

Related U.S. Application Data

[63] Continuation-in-part of application No. 08/625,779, Mar. 29, 1996, Pat. No. 5,667,818, which is a continuation of application No. 08/148,009, Nov. 5, 1993, abandoned.

[51] Int. Cl.[6] .................................................. B29C 47/26
[52] U.S. Cl. ...................... 425/113; 425/133.1; 425/380; 425/462; 425/467
[58] Field of Search ................................. 425/133.1, 113, 425/380, 461, 462, 467; 264/173.12, 173.16, 514

[56] References Cited

U.S. PATENT DOCUMENTS

| | | | |
|---|---|---|---|
| 3,308,508 | 3/1967 | Schrenk | 425/133.1 |
| 3,327,349 | 6/1967 | Lennox | 425/133.1 |
| 3,334,382 | 8/1967 | Lefevre | 425/133.1 |
| 3,365,750 | 1/1968 | Donald | 425/133.1 |
| 3,479,425 | 11/1969 | Lefevre et al. | 425/133.1 |
| 3,947,173 | 3/1976 | Dougherty | 425/133.1 |
| 4,120,633 | 10/1978 | Feuerherm | 425/133.1 |
| 4,125,585 | 11/1978 | Rosenbaum | 425/133.1 |
| 4,134,952 | 1/1979 | Yoshikawa et al. | 425/133.1 |
| 4,248,824 | 2/1981 | Hattop . | |
| 4,279,851 | 7/1981 | Lord et al. . | |
| 4,548,569 | 10/1985 | Pitigliano et al. | 425/133.1 |
| 4,657,497 | 4/1987 | Dehennau et al. | 425/133.1 |
| 4,657,718 | 4/1987 | Sicka et al. . | |
| 4,798,526 | 1/1989 | Briggs et al. | 425/113 |
| 5,108,683 | 4/1992 | Anand . | |
| 5,183,669 | 2/1993 | Guillemette | 425/113 |
| 5,538,411 | 7/1996 | Gates | 425/133.1 |
| 5,544,403 | 8/1996 | Milliman | 425/133.1 |
| 5,672,303 | 9/1997 | Metzger et al. | 425/113 |

*Primary Examiner*—Harold Pyon
*Assistant Examiner*—Joseph Leyson
*Attorney, Agent, or Firm*—Perman & Green, LLP

[57] ABSTRACT

A die body of a die assembly for extruding plastic in tubular layers is constructed having primary and secondary balanced flow paths for two layers of extruded plastic. The primary flow path delivers plastic to a distribution groove in the die body which communicates with a first extrusion channel. A tip die is designed to receive flowing plastic from the secondary flow path of the die body and deliver such plastic to a distribution groove which communicates with a second extrusion channel.

8 Claims, 7 Drawing Sheets

MODULAR DIE ASSEMBLY

This is a continuation-in-part application of U.S. application for patent Ser. No. 08/625,779, filed Mar. 29, 1996, which is a continuation application of U.S. patent Ser. No. 08/148,009, filed Nov. 5, 1993, said earlier application having been abandoned, the parent application having issued as U.S. Pat. No. 5,677,818. The contents of said patent are hereby incorporated herein by reference.

BACKGROUND OF THE INVENTION

In the extrusion of coatings for wire and other tubular shaped plastic parts, it is necessary that the molten plastic is distributed to the die in a balanced flow while avoiding dead spots in the flow path. The die system of this invention utilizes a passage which distributes the molten plastic evenly to the conical passage of the die head. A passage of this type is described in copending application Ser. No. 08/625,779 which is incorporated herein by reference.

Die systems using this balanced flow system are extremely versatile and can be used in single and multiple layer coatings, in coextrusion, in-line and cross head configurations. The multiplicity of uses has created a need for more simple constructions which may be adapted for more than one purpose with a reduced number of parts. In the past a die was designed and manufactured for each end product at significant expense.

It is the purpose of this invention to provide a modular die system comprised of standardized components that can be assembled for multiple applications, thereby facilitating manufacture and use.

SUMMARY OF THE INVENTION

The extrusion die system of this invention consist of four basic parts a die body, a tip/die, a die, and a tip. The die body contains a primary balanced distribution passage including an inlet to receive molten plastic, a pair of flow channels which deliver molten plastic, and a distribution groove constructed in the mating surface of the die body and connected to receive flowing plastic from the primary flow channels.

A secondary balanced distribution passage is also constructed in the die body including an inlet for receiving molten plastic, a pair of flow channels which deliver the molten plastic to outlets in the mating surface separate from the primary distribution groove. The tip/die engages the die body and is constructed with a pair of flow channels having inlets to receive molten plastic from the secondary distribution passage when aligned with the outlets thereof. The flow channels of the tip/die communicate with a distribution groove constructed on its downstream face. Each of the distribution grooves communicates with separate extrusion channels formed by the mating faces of the components. The die and tip are constructed in the well known manner.

BRIEF DESCRIPTION OF THE DRAWING

The invention is described in more detail below with reference to the attached drawing in which.

DETAILED DESCRIPTION OF THE PREFERRED EMBODIMENT

Figure 1:
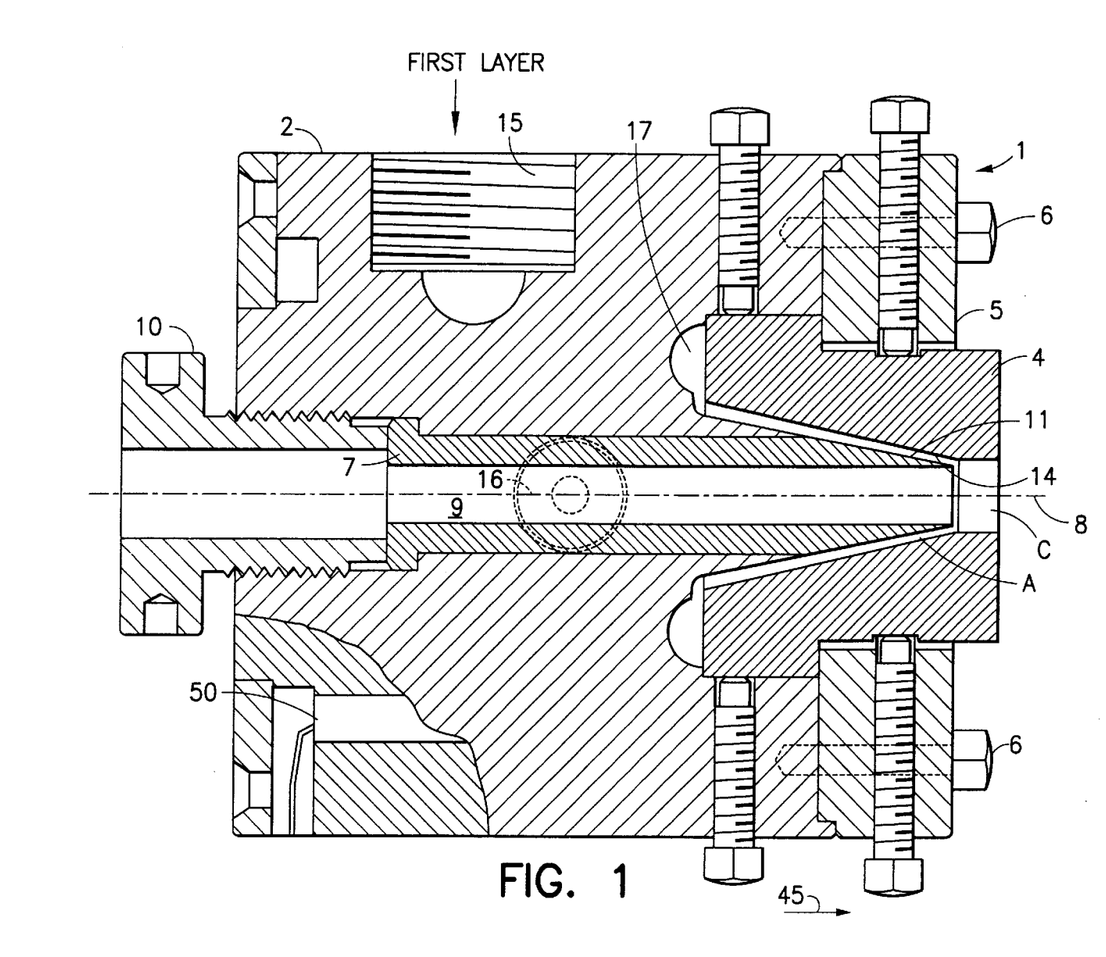
FIG. 1 is a sectional view, through the axis of a die assembly of this invention, showing a three component die system used to apply a single layered coating to a wire.
Figure 2:
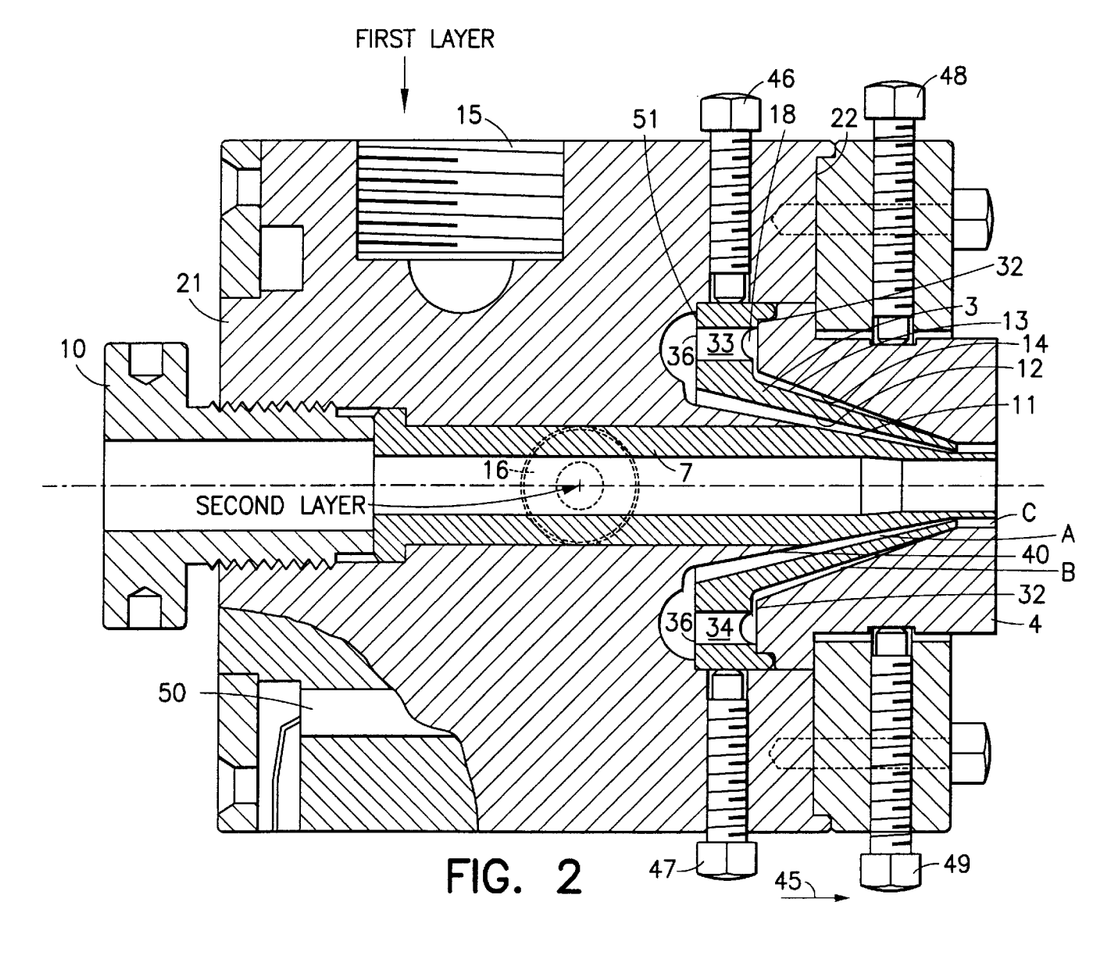
FIG. 2 is a sectional view through the axis of the die assembly of the subject invention showing a four component die system used to apply a double layered coating to a wire.
Figure 3:
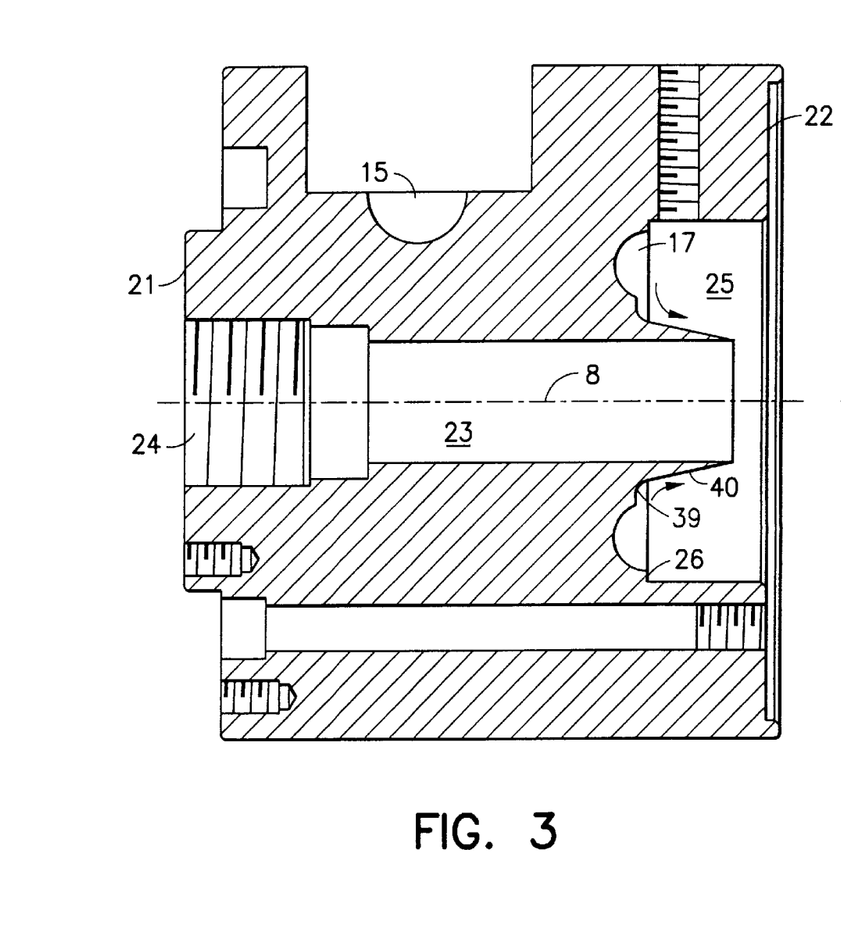
FIG. 3 is a sectional view of the die body of this invention.

A balanced flow die assembly 1 is shown in FIGS. 1 and 2 and consists of a die body 2, a tip die 3, die 4 and tip or core pin 7. The components of the die assembly are held in place by retainer ring 5 and bolts 6. Tip 7 is located on the axis 8 of the die assembly 1 and extends axially through the die assembly 1. Tip 7 is constructed with an axial bore 9 through which wire can be fed for receiving an extruded plastic coating. Each component of the die assembly 1 has an axial bore which receives the tip 7. Tip 7 is held in place by tip bushing 10. Tip bushing 10 is constructed with an axially aligned bore which communicates with bore 9, thereby providing external access to the bore 9. The flow of plastic is generally from left to right through the die assembly 1, as shown by arrow 45 in FIG. 1. The tip 7 has a conically shaped mating surface 11 that, as shown in FIG. 1, cooperates with the conical surface 14 of the die 4 to form a first extrusion channel A for material for a first layer. The extrusion channel A is annular in shape and tapers radially inward in the downstream direction. As shown in FIG. 1, the die assembly 1 will apply a single layer coating on an element, such as a wire, which is drawn through bore 9.

In order to provide a two layer coating, a tip die 3 is inserted into the assembly 1 between the die body 2 and the die 4, as shown in FIG. 2. Tip die 3 is constructed with an upstream facing, interior conical surface 12 and an axially displaced, downstream facing, exterior conical surface 13. Upstream facing conical surface 12 cooperates with the downstream facing conical surface 11 of tip 7 to form the annular extrusion channel A. Downstream facing conical surface 13 of the tip die 3 cooperates with the upstream facing conical surface 14 of die 4 to form a second extrusion channel B for material for the second layer. Similarly, the extrusion channel B is annular in shape and tapers radially inward in the downstream direction. As shown, the components are generally of cylindrical shape and are axially aligned in the assembled condition. To assist in alignment of the components, adjustment screws 46, 47, 48, and 49 engage and support the tip die 3 and die 4, as shown in FIG. 2.

In accordance with this invention, extrusion channels A and B receive molten plastic through primary flow channels 19 and secondary flow channels 20 constructed in the die body 2. It will be observed that, in the configuration of FIG. 1, the flow channels 20 for extrusion channel B are closed by the die 4 for the purpose of single layer extrusion.

Die body 2 is shown in FIGS. 3 through 6 and is constructed to minimize the number of components required in the assembly. Die body 2 consists of a cylindrical member having a upstream end 21 and a downstream end 22. Bore 23 is constructed along axis 8 to receive tip 7. The entrance 24 to bore 23 is threaded to receive bushing 10. Inlets 15 and 16 are constructed in the outer surface of die body 3 to receive molten plastic for first and second layers. Downstream end 22 has a cylindrical recess 25 constructed to receive tip die 3 and die 4 and to hold these components in axial alignment. The bottom face 26 of the cylindrical recess 25 faces downstream and is constructed with a distribution groove 17 of a particular configuration to promote a balanced flow as described below.

Figure 4:
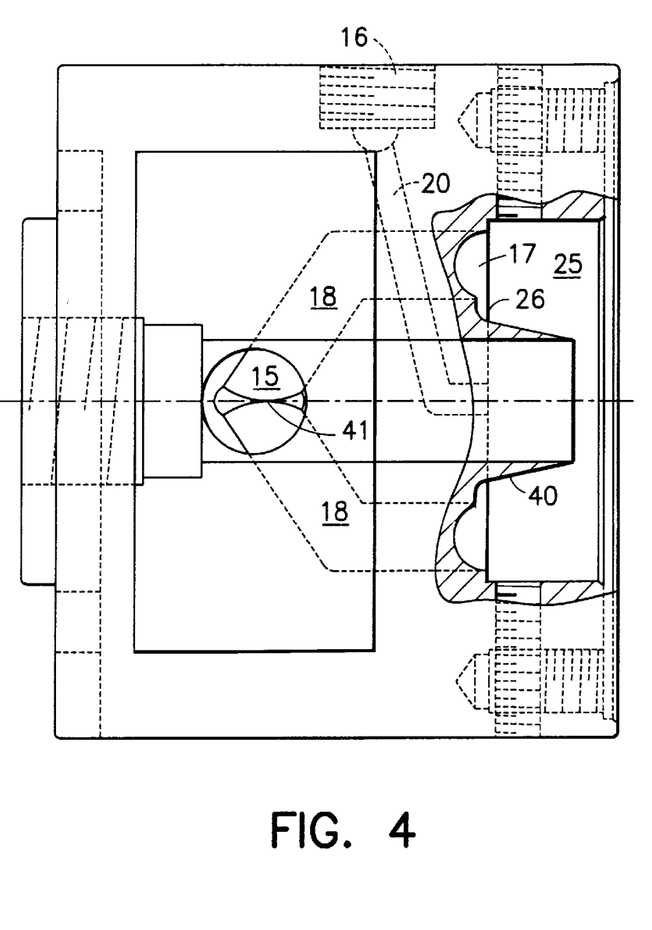
FIG. 4 is a side view of the die body of this invention showing the balanced flow passage.
Figure 5:
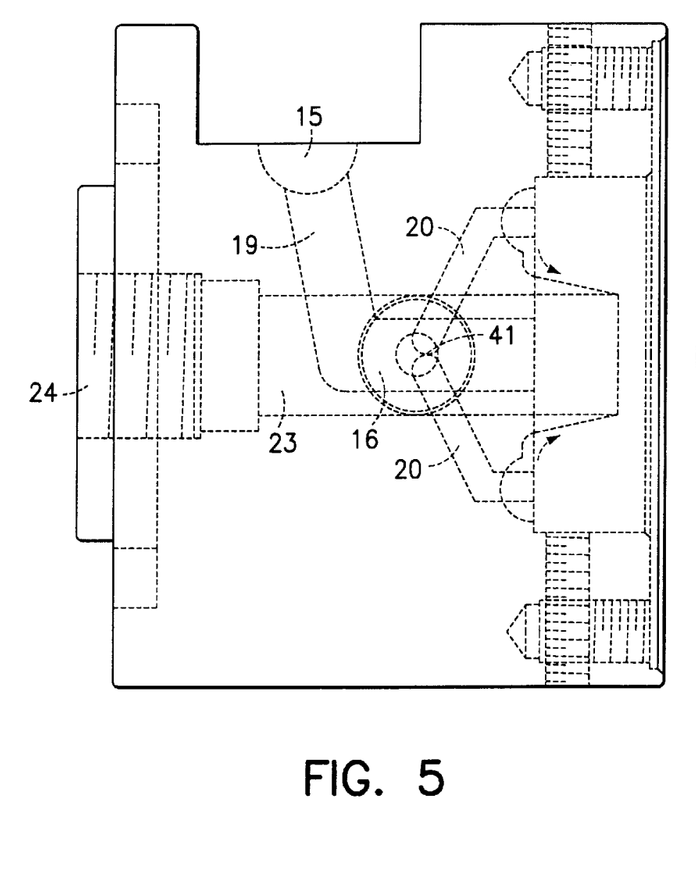
FIG. 5 is a top view of the die body of this invention, showing the balanced flow passage.
Figure 6:
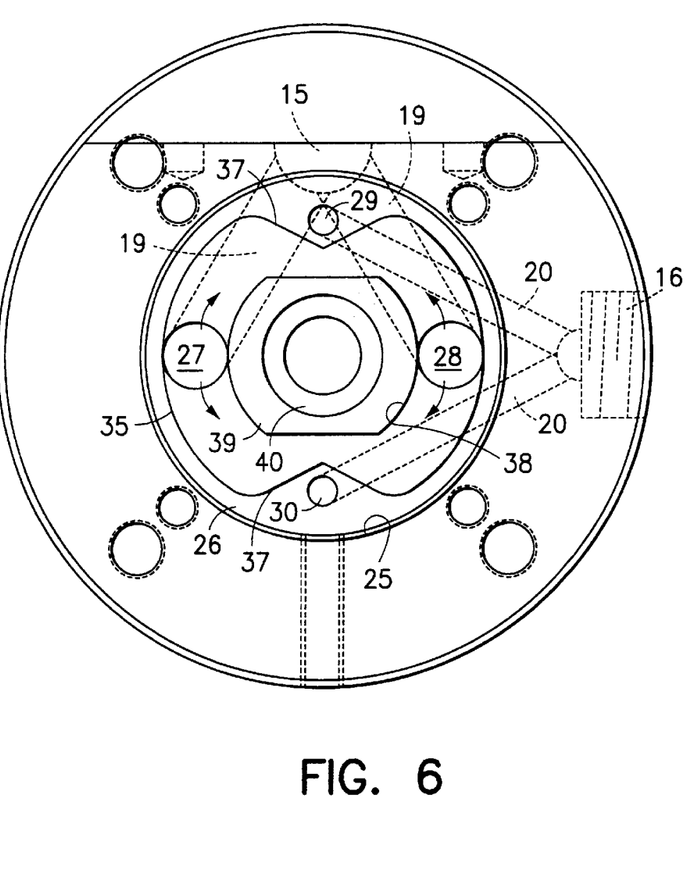
FIG. 6 is an end view of the die body of this invention showing the distribution groove.

As shown in FIGS. 4, 5, and 6, a pair of flow channels 19 communicate with inlet 15 and extend to the outlets 27 and 28 to groove 17 to deliver molten plastic thereto. Groove 17 communicates with the extrusion channel A. A second pair of flow channels 20 communicate with the inlet 16 and the outlets 29 and 30 formed in the bottom face 26.

Figure 8:
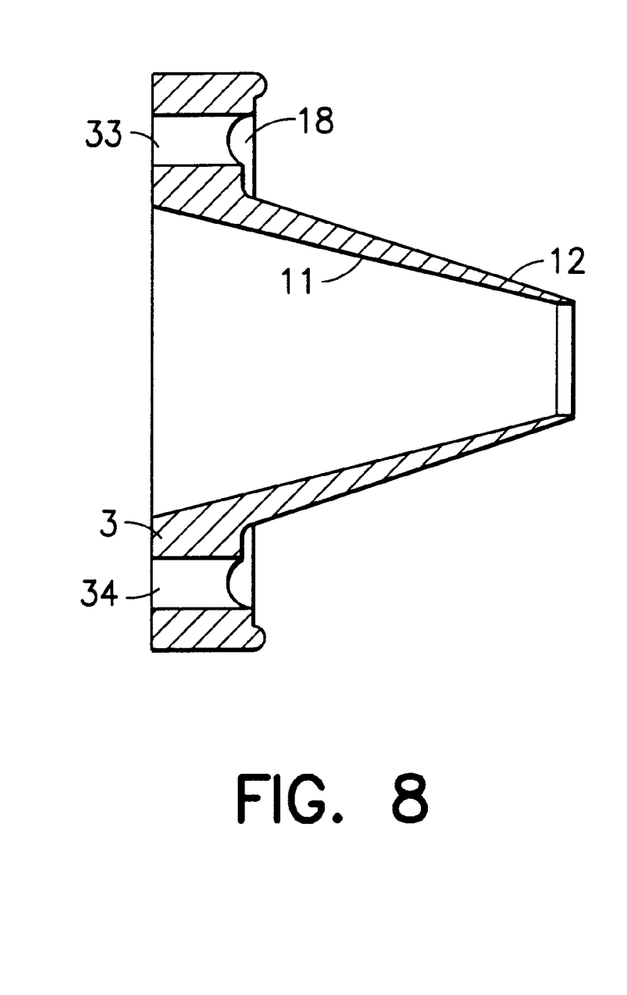
FIG. 8 is a side view of the tip die module of this invention.
Figure 9:
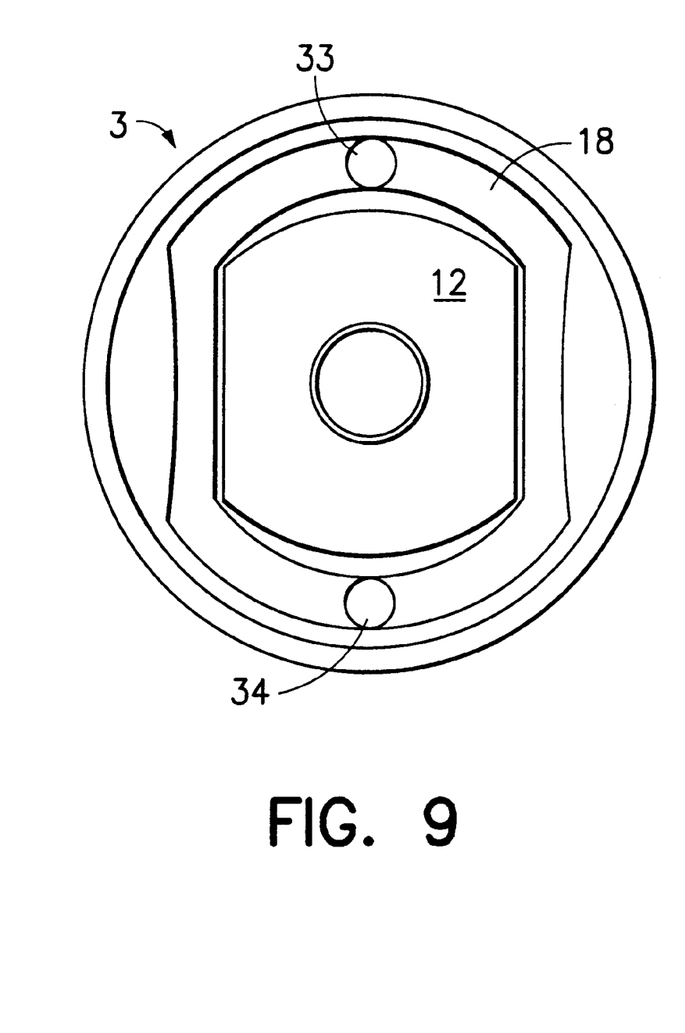
FIG. 9 is an end view of the tip die module of FIG. 8.

Referring to FIGS. 2, 8 and 9 tip die 3 is constructed with a radially extending flat surface 31, which merges with conical surface 12. Surface 31 engages the bottom face 26. A substantially parallel and coextensive surface 32 is constructed axially displaced downstream from surface 31 facing downstream. Surface 32 merges with the downstream facing conical surface 13 of the tip die 3. A second distribution groove 18 is constructed in the surface 32 and is similarly configured to distribution groove 17. Axially extending flow channels 33 and 34 are constructed having inlets 70 and 36 which align with the outlets 29 and 30 (as shown in FIG. 6) of the secondary flow channels 20 in die body 2 when the tip die 3 is assembled in the recess 25. Groove 18 receives molten plastic from outlets 29 and 30 and communicates with the extrusion channel B.

Extrusion channels A and B merge together to form a single exit channel C. The two layers of plastic material join at the juncture of channels A and B subject to the elevated temperature and pressure of the die. Material from channel B will be deposited around the circumference of the material introduced from channel A and the layered material will exit the die through channel C.

The proper operation of die assembly 1 requires that a balanced flow be maintained throughout. Accordingly, the die assembly 1 is constructed with a balanced flow passage starting with inlets 15 and 16 which receive molten plastic from extruders (not shown). Primary and secondary flow channels 19 and 20 communicate with inlets 15 and 16 respectively to deliver molten plastic to distribution grooves 17 and 18. Distribution groove 17 in die body 2 receives flowing plastic directly from flow channels 19 through outlets 27 and 28. Flow channels 20 communicate with the flow channels 33 and 34 to deliver molten plastic to groove 18 of the tip die 3. The flow channels 19 and 20 diverge to avoid intersection with the axial bore 23. To enhance the even distribution of plastic into both channels, a flow dividing wedge 41 is constructed at the junction of the two channels.

Distribution Grooves 17 and 18 have a substantially semi-circular cross section and are constructed in face 26 of recess 25 and face 32 of tip die 3 respectively and extend in a plane generally transverse to the axis 8 of the die assembly 1. Each groove has inlets positioned one hundred and eighty degrees apart to receive molten plastic. Each of the distribution grooves 17 and 18 are constructed similarly. Referring to distribution groove 17, as shown in FIG. 6, the groove 17 has an upstream circumferential edge 35 in which are constructed two symmetrically placed blending wedges 37 extending into the groove to encourage movement of molten plastic in the groove radially inward. The blending wedges 37 are arranged equidistant from the inlets 27 and 28. The downstream edge 38 of the groove 17 consists of a flat land 39 merging into the conical surface 40 which in turn merges with conical surface 11 of tip 7. To enhance the distribution function of the groove 17, the land 39 is constructed of diminished width and/or height in the area of the blending wedge 37, away from the inlets, so that the downstream edge 38 merges more directly into the conical surface 40 opposite the blending wedges 37 and operates to restrict the flow of plastic over the edge 38 in the vicinity of the inlets.

Flowing plastic is introduced to the groove 17 symmetrically by the flow channels 19. The plastic flow diverges in opposite directions around the groove 17 as shown by the arrows in FIG. 6. Since the downstream edge 38 is of lesser height than the upstream edge 35, an annular opening is formed. The molten plastic therefore flows over the edge 38 to the conical surface 40, as shown by the arrows in FIGS. 3 and 5.

Because of the extended width of the land 39 of the edge 38 in the vicinity of the inlets 36, plastic flow over the edge 38 is restricted at the inlet and the groove tends to fill with plastic. The flow extends evenly over the edge 38 to create an even distribution of plastic in the conical extrusion passage A. Blending wedges 37 tend to direct the flow of plastic into channel A over the land 39 at its thinnest area first, thereby allowing the distribution groove 17 to fill and further enhancing the balanced distribution of the molten plastic. Together the flow channels 19 and distribution groove 17 form a balanced flow passage for the first layer of plastic.

Similarly flow channels 20, 33 and 34 deliver molten plastic from inlet 16 to a second distribution groove 18 which is similar in structure to the groove 17 described above. The downstream edge of groove 18 merges with conical surface 13 which forms part of the extrusion channel B. In this manner a totally balanced flow of two streams of extruded plastic exits the extrusion channels A and B in channel C.

The structure of die body 2 can be combined with a wide variety of tip die and die designs to provide an almost infinite number of combinations. Die assemblies which provide diverse functions from multiple layers to striping can now be formed from standard modular components. In many instances it is desirable to heat the assembly. The design of the modular assembly of this invention, allows this to be built in to the die body module in a convenient manner. As shown in FIGS. 1 and 2, a calrod type cartridge heater 50 is constructed in die body 2.

Figure 7:
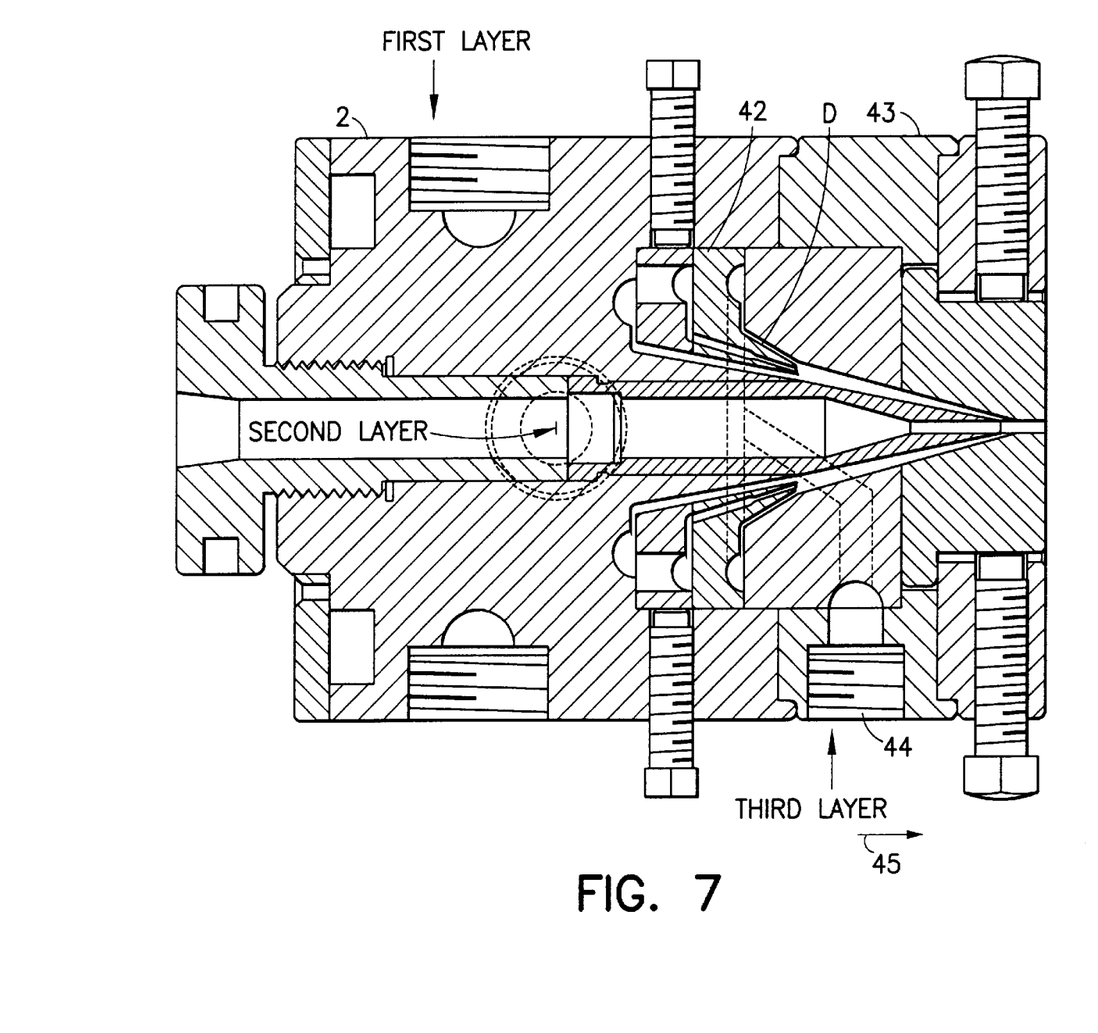
FIG. 7 is a sectional view, through the axis of an alternate embodiment of the die assembly of this invention, used to provide a triple layered coating.

FIG. 7 shows an example of a triple layer extrusion die assembly. In this embodiment, a supplemental tip die 42 is inserted between primary tip die 3 and die 4. A further flow channel insert 43 is used to provide an inlet 44 for plastic supplied to the third layer extrusion channel D.

Figure 10:
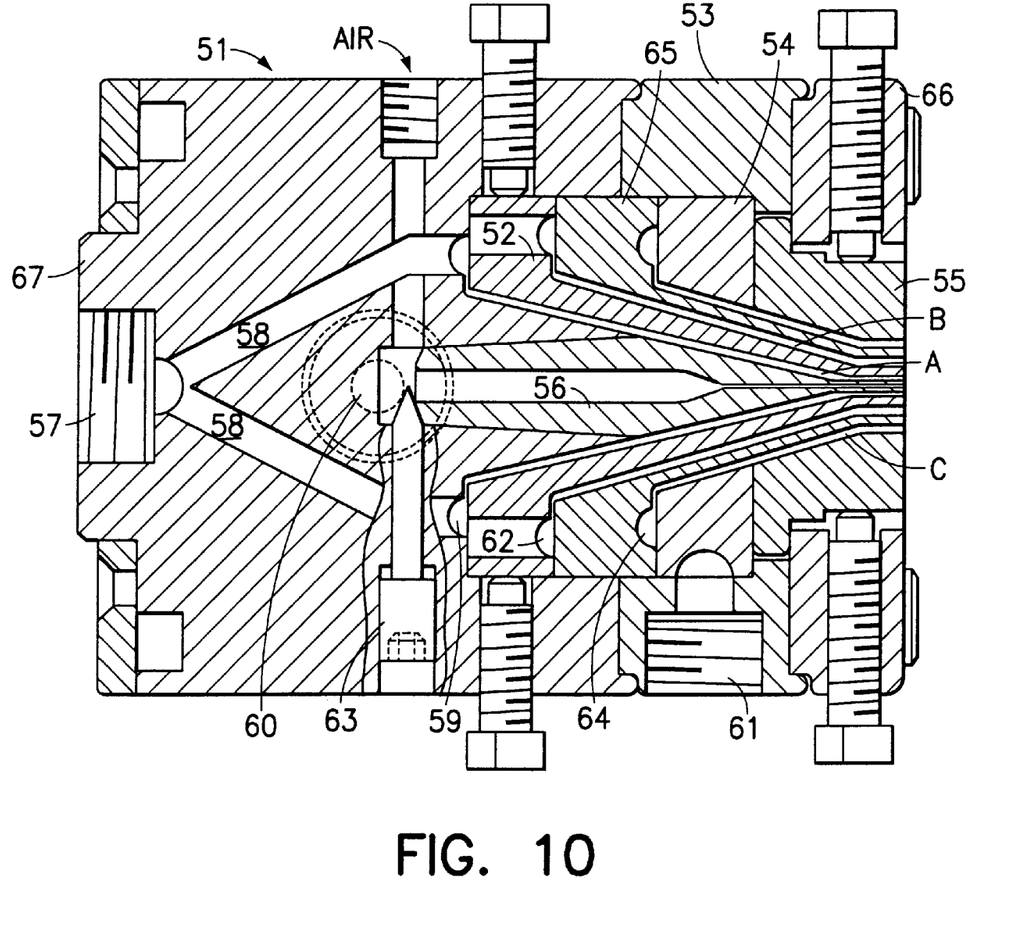
FIG. 10 is a side view of an alternate embodiment of this invention.

In an alternative embodiment of the invention shown in FIG. 10, a modular die assembly is constructed for extruding up to three layers of plastic material and consists of die body module 51, tip die module 52, a secondary tip die module 65, tip module 56, and die module components 53, 54, and 55. The assembly being secured together by a collar 66. Since the tip 56 is held in place partially by a force fit, knock out pin 63 is provided to facilitate tip removal.

Die body module 51 is constructed with primary flow channels 58 which receive plastic material through an inlet 57 constructed in the upstream face 67 and deliver it to the distribution groove 59. Secondary flow channels (not shown) communicate with inlet 60 to carry plastic material to the distribution groove 62 of tip die module 52 in a manner similarly to flow channels 20, as shown in FIG. 5. A third inlet 61 allows the insertion of material suitable for a third layer into flow channels (not shown) which communicate with a third distribution groove 64. Extrusion channels A, B, and C are formed by the mating relationships of the module surfaces and communicate respectively with the distribution grooves 59, 62 and 64. The operation of this embodiment is substantially the same as previously described, but shows an inline die assembly configuration.

The die assemblies of this invention could be used to construct tubular and other shaped end products as well as coated wire products. The central bore 9 of the tip 7 can be used to supply air internally to the layered tube to maintain an open central passage in the tubular product as is well known.

I claim:

1. A modular die assembly for extruding plastic in tubular layers, said plastic flowing through the die assembly from upstream to downstream in a balanced flow passage, comprising:
   a first module having an upstream face, a downstream face, and an outer periphery, and primary and secondary flow channels constructed therein, said flow channels including first and second inlets, communicating respectively with said primary and secondary flow channels to receive flowing plastic, and separated outlets constructed in the downstream face and communicating respectively with the primary and secondary flow channels to allow flowing plastic to exit therefrom;
   a second module constructed to engage the downstream face of the first module to form a first extrusion channel therewith, said second module operatively engaging the first module to close the outlet for the secondary flow channel; and
   a first distribution groove constructed in the downstream face of said first module, said first distribution groove communicating with the outlet for said primary flow channel to receive flowing plastic therefrom; said first distribution groove communicating with the first extrusion channel to distribute flowing plastic thereto.

2. A modular die assembly for extruding plastic in tubular layers, said plastic flowing through the die assembly from upstream to downstream in a balanced flow passage, comprising:
   a first module having an upstream face, a downstream face, and an outer periphery, and primary and secondary flow channels constructed therein, said flow channels including first and second inlets, communicating respectively with said primary and secondary flow channels to receive flowing plastic, and separated outlets constructed in the downstream face and communicating respectively with the primary and secondary flow channels to allow flowing plastic to exit therefrom;
   a second module having an upstream face;
   an intermediate module having upstream and downstream ends, said intermediate module assembled between the first and second module, said upstream end of said intermediate module constructed to engage the downstream face of the first module to form a first extrusion channel therewith, said intermediate module having radially displaced axially extending flow channels constructed therein, said flow channels having inlets constructed in said upstream end of said intermediate module which align with the outlets of the secondary flow channels of the first module when said intermediate module and the first module are engaged, said downstream end of said intermediate module being constructed to engage the upstream face of the second module to form a second extrusion channel therewith;
   a first distribution groove constructed in the downstream face of said first module, said first distribution groove communicating with the outlets for said primary flow channel to receive flowing plastic therefrom; said first distribution groove communicating with the first extrusion channel to distribute flowing plastic thereto;
   a second distribution groove constructed in the downstream face of said intermediate module, communicating with the flow channels of the intermediate module to receive flowing plastic therefrom, said second distribution groove communicating with the second extrusion channel to distribute flowing plastic thereto.

3. A modular die assembly for extruding plastic in tubular layers, said plastic flowing through the die assembly from upstream to downstream in a balanced flow passage, as described in claim 2 wherein the first module is constructed with an axially extending bore further comprising:
   a third module constructed with an upstream and downstream end and sized to fit within the axial bore of the first module, the downstream end of said third module projecting axially downstream from the first module to form a conical mating surface; and
   wherein the intermediate module is further constructed having an upstream facing conical mating recess to receive the downstream end of the third module and form the first extrusion channel therewith, said first extrusion channel communicating with the first distribution groove to receive flowing plastic therefrom.

4. A modular die assembly for extruding plastic in tubular layers, said plastic flowing through the die from upstream to downstream in a balanced flow passage, as described in claim 3 wherein the intermediate module, the second module, and the third module are constructed with axially extending bores that form a continuous axial bore through the modular die assembly.

5. A modular die assembly for extruding plastic in tubular layers, said plastic flowing through the die assembly from upstream to downstream in a balanced flow passage as described in claim 3 wherein the first module is constructed with a recess in its downstream face sized to receive the intermediate module and the second module and secure said modules in axial alignment and wherein the first distribution groove is constructed in the recess.

6. A modular die assembly for extruding plastic in tubular layers, said plastic flowing through the die assembly from upstream to downstream in a balanced flow passage as described in claim 3 wherein the primary and secondary flow channels of said first module are each comprised of a pair of flow channels joined at the respective inlet, having dividing means at the junction of said pair of flow channels to provide a balanced distribution of the plastic flow between the pair of channels, said pair of flow channels extending downstream within the first module and communicating with the respective outlets in the downstream face of the first module.

7. A modular die assembly for extruding plastic in tubular layers, said plastic flowing through the die assembly from upstream to downstream in a balanced flow passage as described in claim 6 wherein the first and second distribution grooves each comprises:

a substantially annular chamber having chamber inlets positioned symmetrically within the chamber, said inlets communicating with the respective outlets to receive flowing plastic therefrom, said chamber having a downstream edge communicating with an annular outlet to allow flowing plastic to escape therefrom, said chamber further constructed with a pair of blending means to direct the flow of plastic towards the downstream edge, said blending means positioned symmetrically in the annular chamber equidistant from the chamber inlets.

8. A modular die assembly for extruding plastic in tubular layers, said plastic flowing through the die assembly from upstream to downstream in a balanced flow passage as described in claim 7 wherein the downstream edge of the groove is constructed with a land which extends substantially radially inward a distance to meet the respective extrusion channel, wherein said distance is greater in the area of the groove inlets than in the area of the blending wedges.

* * * * *